United States Patent [19]

Kanamaru

[11] Patent Number: 4,839,746
[45] Date of Patent: Jun. 13, 1989

[54] INFORMATION REPRODUCTION METHOD FOR COMPLEX AND CD DISKS

[75] Inventor: Hitoshi Kanamaru, Saitama, Japan

[73] Assignee: Pioneer Electronic Corporation, Tokyo, Japan

[21] Appl. No.: 102,706

[22] Filed: Sep. 30, 1987

[30] Foreign Application Priority Data

Sep. 30, 1986 [JP] Japan .................. 61-232654
Sep. 30, 1986 [JP] Japan .................. 61-232655

[51] Int. Cl.$^4$ .................. H04N 5/76; G11B 27/22
[52] U.S. Cl. .................. 358/342
[58] Field of Search ........... 358/342, 335, 343, 341; 369/59, 50, 32; 360/10.1, 19.1, 32

[56] References Cited

U.S. PATENT DOCUMENTS

| | | | |
|---|---|---|---|
| 4,476,499 | 10/1984 | Kanamaru et al. | 358/342 |
| 4,587,643 | 5/1986 | Monen et al. | 369/59 |
| 4,602,295 | 7/1986 | Moriyama et al. | 358/343 |
| 4,604,655 | 8/1986 | Moriyama | 358/343 |
| 4,613,908 | 9/1986 | Takahashi et al. | 360/9.1 |
| 4,641,204 | 2/1987 | Sugiyama | 358/342 |
| 4,641,295 | 2/1987 | Furukawa et al. | 369/59 |
| 4,647,985 | 3/1987 | Yokosawa | 358/343 |
| 4,660,100 | 4/1987 | Sugiyama et al. | 358/342 |
| 4,672,472 | 6/1987 | Sugiyama | 358/342 |
| 4,707,818 | 11/1987 | Suzuki et al. | 358/342 |
| 4,724,492 | 2/1988 | Kosaka et al. | 358/343 |
| 4,736,355 | 4/1988 | Kanamaru | 369/59 |

*Primary Examiner*—Donald McElheny, Jr.
*Attorney, Agent, or Firm*—Sughrue, Mion, Zinn, Macpeak, and Seas

[57] ABSTRACT

A reproducing apparatus and method for both CD and complex disks capable of displaying a still frame of video information during the reproduction of the audio portion of a complex disk. When reproduction of a disk is first started, it is detected whether the disk is a complex disk or a CD. In the former case, the pickup is immediately shifted to the region where both audio and video information are recorded and reproduction is begun. During the reproduction of this region, a frame of video data is extracted and saved in a memory for reproduction during the playing of the solely audio portion of the disk.

5 Claims, 3 Drawing Sheets

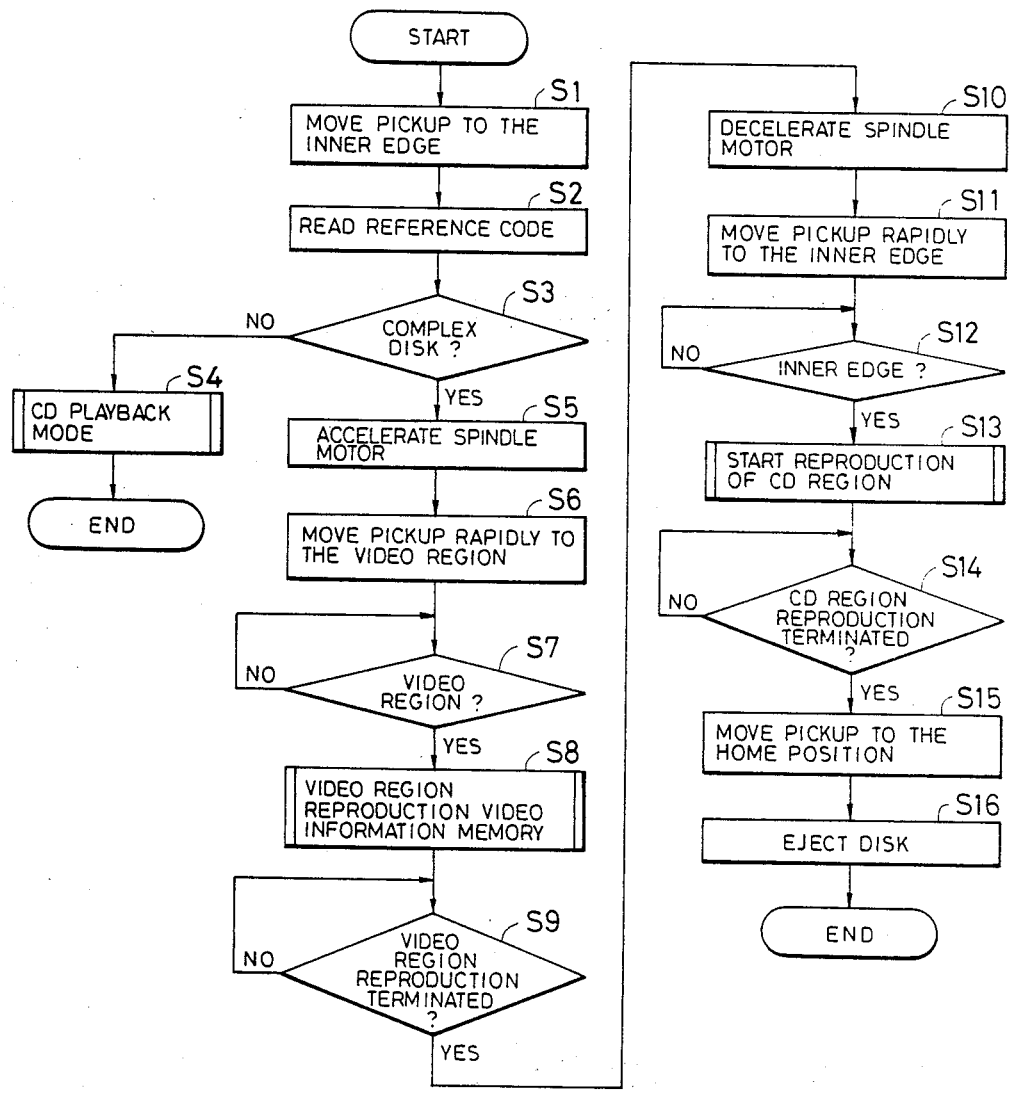

INFORMATION REPRODUCTION METHOD FOR COMPLEX AND CD DISKS

BACKGROUND OF THE INVENTION

The present invention relates to a recording disk reproducing apparatus, particularly, to a reproducing apparatus capable of reproducing a disk on which a digital signal is recorded.

A small digital audio disk having a diameter of about 12 cm and referred to as CD (compact disk) is well known. Also, a disk (which is hereinafter referred to as complex disk) which has the same size as a CD and on which a PCM (pulse code modulated) audio signal is recorded together with an FM (frequency modulated) video signal has been recently developed. The complex disk has a first, inner region in which PCM audio information is recorded, and a second region which extends outside a prescribed radial position and in which both an FM video signal and a PCM audio signal are recorded together in a superposed state.

When the compact disk is reproduced, generally reproduction is started with the innermost portion of the recorded region of the disk, a reference code recorded in a lead-in area is read, and reproduction is sequentially executed from the innermost portion of the recorded region proceeding toward the outermost portion, continuing unless a command for the preset selection of a music selection or the like is issued by the operator. For that reason, for a reproducing apparatus capable of reproducing not only compact disks but also complex disks, reproduction of the complex disk is also started with the first region (inner region) thereof, as long as a special command is not inputted by the operator.

As for the complex disk, a program recorded in the second region of the disk and consisting of both video information and audio information is treated as the main program for the disk, a program recorded in the first region of the disk and consisting of only audio information is handled as an auxiliary program. Ordinarily, the programs recorded in the first and the second regions are related to each other.

Since only audio information is recorded in the first region of the complex disk, no video information can be obtained during the reproduction of the first region and no television monitor is therefore required at such time. However, the television monitor required during the reproduction of the second region of the complex disk must be kept on continuously during reproduction of the first region. For that reason, some image should be displayed on the television monitor even during reproduction of the first region of the complex disk.

If reproduction is started with the auxiliary program recorded in the first region of the complex disk, the main program recorded in the second region of the complex disk and intended by the program provider to be reproduced is likely not to be reproduced at all. Even if the main program is reproduced, it comes last. For these reasons, it is inconvenient to use such a reproduction apparatus, particularly when both compact disks and complex disks are present together in an automatic changer.

SUMMARY OF THE INVENTION

The present invention was made in consideration of the above-mentioned drawbacks.

Accordingly, it is an object of the present invention to provide a disk reproducing apparatus in which an image related to the first region of a complex disk can be displayed in a still mode during the reproduction of the first region.

It is another object of the present invention to provide an information reproducing system for a disk reproducing apparatus in which a complex disk can only be reproduced as intended by the program provider of the disk.

The recording disk reproducing apparatus provided in accordance with the present invention is capable of reproducing complex disks, and includes a video memory capable of storing an amount of video information for at least one field. The video information for at least one field is read from the complex disk and written into the video memory during the reproduction of the second region of the disk and is read from the video memory and supplied as a video output during the reproduction of at least the first region of the disk. When a disk to be reproduced is found to be a complex disk, the second region of the disk is reproduced with priority over any other region thereof.

BRIEF DESCRIPTION OF THE DRAWINGS

FIG. 5 is a flowchart of a procedure taken by a central processing unit to reproduce a complex disk.

DESCRIPTION OF THE PREFERRED EMBODIMENTS

A preferred embodiment of the present invention, which is a disk reproducing apparatus, will hereafter be described in detail with reference to the drawings.

Figure 1:
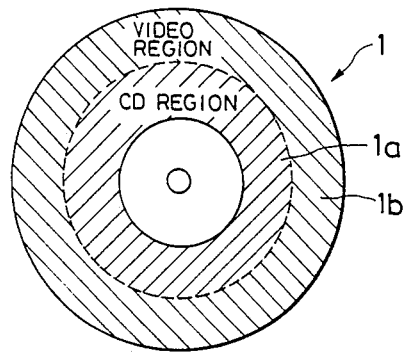
FIG. 1 shows the recording regions of a complex disk.

FIG. 1 shows a complex disk 1 bearing a first region 1a, which is an inner region, referred to as a CD region and in which audio information subjected to PCM is recorded, and a second region 1b, which is an outer region, hereinafter often referred to as a video region, and in which a video signal subjected to FM and an audio signal subjected to PCM are recorded together in a superposed state. The FM video signal includes components of higher frequencies than the FM audio signal.

Figure 2:
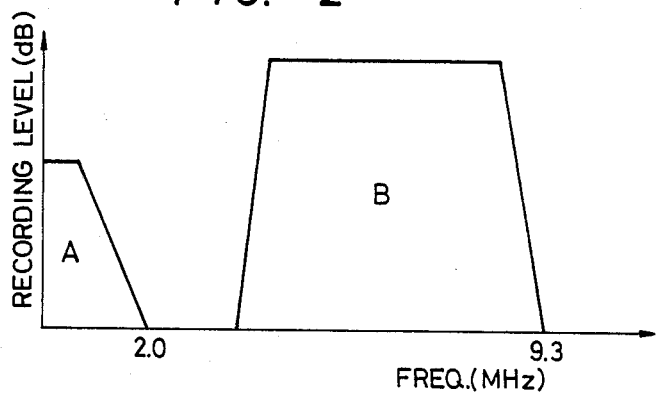
FIG. 2 shows the frequency spectrum of a signal recorded in the video region of the complex disk.
Figure 3:
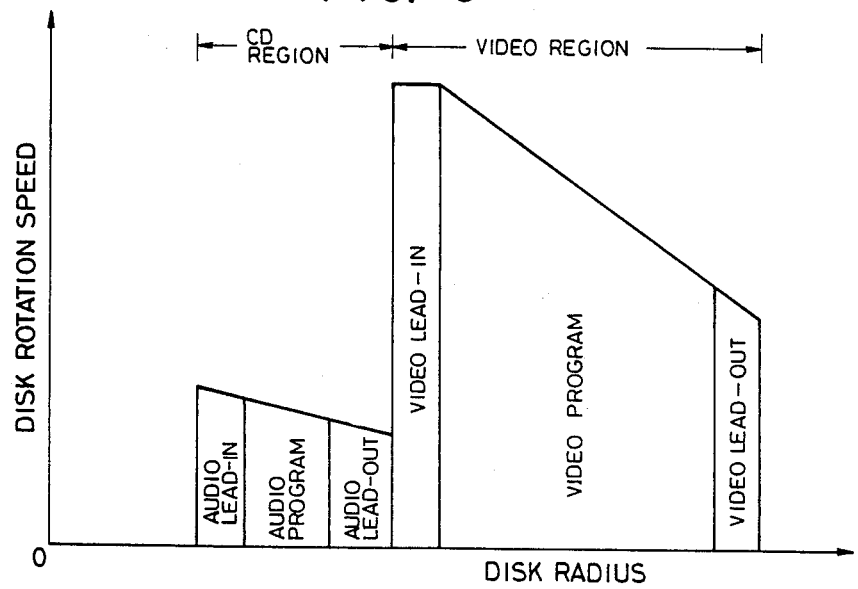
FIG. 3 shows the contents of the recording regions of the complex disk.

FIG. 2 shows the frequency spectrum of the signals recorded in the video region 1b. Shown at A and B in FIG. 2 are a first component, which is the audio signal subjected to PCM, and a second component, which is the video signal subjected to FM, respectively. Due to the different frequency spectrums, the rotational speed of the disk 1 for the video region 1b must be higher than for the CD region 1a. As shown in FIG. 3, the speed of the disk 1 is several hundred rpm for the CD region 1a, more than about 2,000 rpm for the inner edge of the video region 1b, and more than about 1,000 rpm for the outer edge of the video region. Thus, the speed of the disk 1 for the video region is much higher than for the CD region.

The starting portions of both the CD region 1a and the video region 1b are provided with lead-in areas in which first and second groups corresponding to the regions and consisting of reference codes related to the recorded contents of the regions and indicating the time of the beginning and end of each small section of the regions or the like are recorded. The reference codes recorded in the lead-in area of the CD region include disk type information which indicates whether the disk to be reproduced is a complex disk or not.

The constitution of the inventive disk reproducing apparatus capable of reproducing such a complex disk 1 will now be described.

Figure 4:
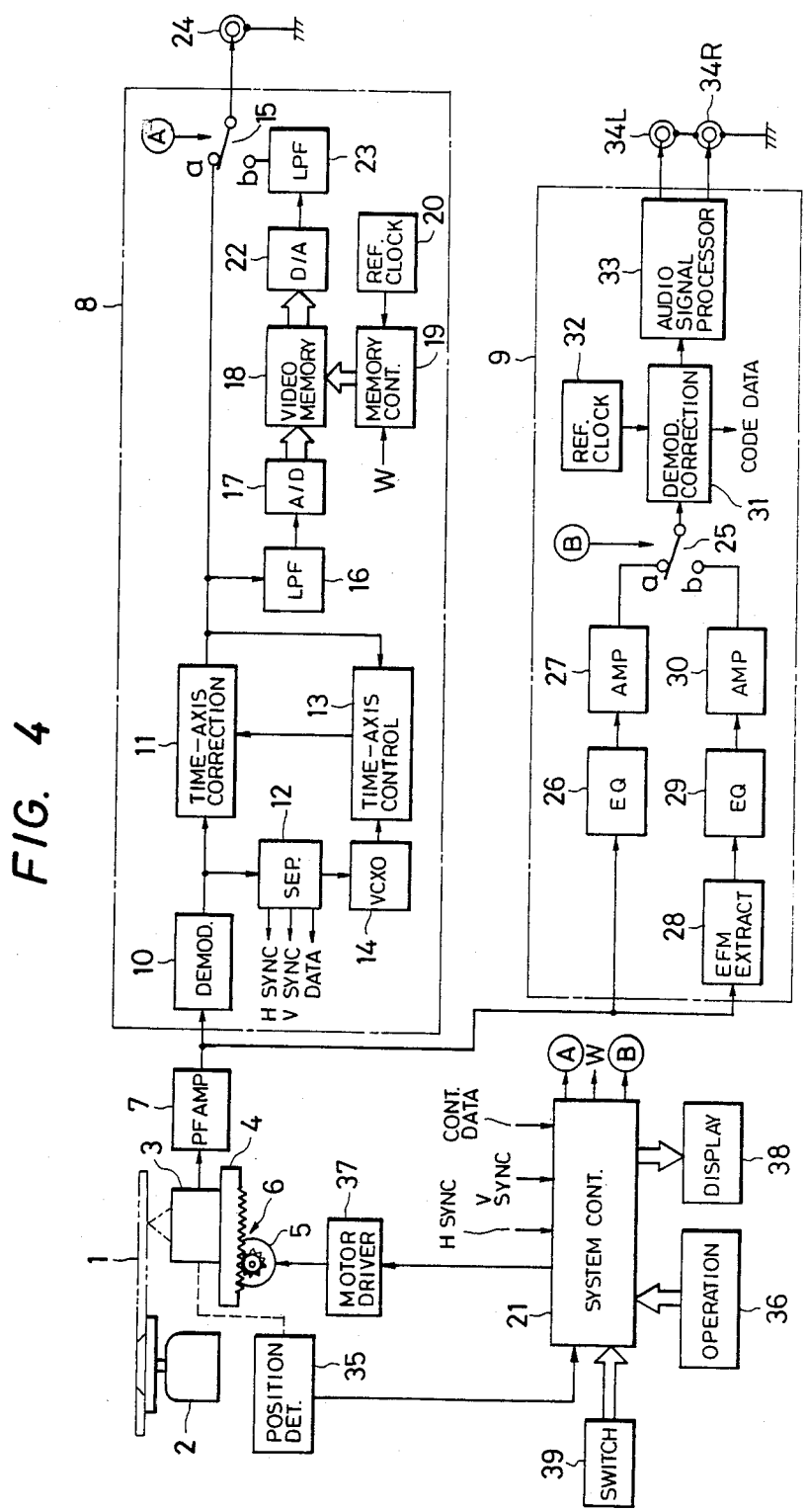
FIG. 4 is a block diagram of a recording disk reproducing apparatus provided in accordance with the present invention.

As shown in FIG. 4, the disk 1 is rotated by a spindle motor 2 to read recorded information from the disk through an optical pickup 3. The pickup 3 has an optical mechanism including a laser diode, an objective lens, a photosensor, a focusing actuator for driving the objective lens in the direction of its optical axis relative to the information recording surface of the disk, and a tracking actuator which acts so that a beam spot (which is in an information detection point) emitted by the pickup 3 is moved in the radial direction of the disk relative to the recording track of the disk. The pickup 3 is carried by a slider 4 which can be moved in the radial direction of the disk 1 by a slider motor 5 through a drive mechanism including a rack and a pinion in combination, for example. The output RF signal from the pickup 3 is supplied to a video information demodulator 8 and a digital information demodulator 9 through an RF amplifier 7.

In the video information demodulator 8, an RF signal from the RF amplifier 7 is demodulated into a video signal by a demodulation circuit 10, and the video signal is supplied to a time-axis correction circuit 11 and a separation circuit 12. In the separation circuit 12, a horizontal synchronizing signal, a vertical synchronizing signal, and control data are separated from the video signal. The time-axis correction circuit 11 includes a variable delay element such as a charge coupled device. The amount of delay imposed by the variable delay element is set in accordance with a control signal from a time-axis control circuit 13 so as to perform time-axis correction. The oscillation output from a quartz oscillator 14, which oscillates synchronously with the horizontal synchronizing signal (for example) separated by the separation circuit 13, the oscillation output frequency divided, and a control signal dependent on the phase difference between the color burst signal and the synchronizing signal processed through the time-axis correction circuit 11 are outputted by the time-axis control circuit 11. The constitution of the time-axis control circuit 13 is described in Japanese Patent Application (OPI) No. 102182/81.

The video signal subjected to time-axis correction is supplied as one input to a selection switch 15 and also supplied to an A/D (analog/digital) converter 17 through a low-pass filter 16. In the A/D converter 17, the video signal is sampled at a prescribed period and sampled values resulting from the sampling are sequentially converted into digital data. The output digital data from the A/D converter 17 are supplied to a video memory 18, implemented with a RAM (random access memory) or the like having a capacity sufficient to store video information for at least one field. Address and mode control for the video memory 18 are performed by a memory control circuit 19 so that the data written at the various addresses in the video memory are sequentially read therefrom and the video memory rewritten in response to a write-enable signal from a system controller 21 (described below). The data read from the video memory 18 are converted into an analog signal by a D/A (digital/analog) converter 22. The analog signal is supplied as another input to the selection switch 15 through a low-pass filter 23. The selection switch 15 is usually in a first position (a) so that the video signal supplied directly from the time-axis correction circuit 11 is passed to a video input terminal 24. The selection switch 15 is shifted to a second position (b) in response to a change-over command from the system controller 21, whereby the video signal supplied through the video memory 18 is selected and sent to the video output terminal 24.

The digital information demodulator 9 includes a selection switch 25, which is set depending on whether the CD region of the complex disk 1 is to be reproduced or the video region thereof is to be reproduced. When the CD region of the disk 1 is to be reproduced, the selection switch 25 is set to position (a), while when the video region of the disk 1 is to be reproduced, the selection switch 25 is set to position (b). The setting of the selection switch 25 is performed depending on a changeover command issued by the system controller 21.

As described with reference to FIG. 3, there is a very large difference between the rotational speed of the complex disk 1 for reproduction of the CD region and for reproduction of the video region. The PCM audio signal is an EFM (eight-to-fourteen modulation) signal, for example. For that reason, if the digital signal were directly superposed on the FM video signal in the video region of the complex disk 1 at the time of original recording, the digital signal would adversely affect the low-frequency component of the FM video signal. The EFM signal is thus recorded at a level several decibels lower than the video carrier (refer to FIG. 2), although the FM signal and the FM video signal have the same degree of modulation. As a result, the EFM signal is made to have a different frequency characteristic and amplitude between the reproduction of the CD and video regions. Therefore, a reproduced EFM signal processing section is switched between reproduction of the CD region and the video region so as to jointly use the digital information demodulator 9.

During reproduction of the CD region, the reproduced RF signal is an EFM signal which has a frequency characteristic compensated by an equalizer circuit 26 having a prescribed equalizing property and is then amplified at a prescribed gain by an amplifier 27. During reproduction of the video region, only an EFM signal included together with the FM video signal in the reproduced RF signal is extracted by an EFM signal extraction circuit 28 (a low-pass filter or the like). has its frequency characteristic compensated by an equalizer circuit 29, having an equalizing property different from that of the equalizer circuit 26, and is then amplified by amplifier 30 whose gain is larger than that of the amplifier 27. The resulting EFM signal is a signal whose frequency characteristic and amplitude are equal to those of the EFM signal during reproduction of the CD region.

When a compact disk is being reproduced by the disk reproducing apparatus, the selection switch 25 is always set to the (a) position.

The reproduced EFM signal chosen through the selection switch 25 is supplied to a demodulation/correction circuit 31, which demodulates the EFM signal. The resulting signal is written into a memory such as RAM, the memory is controlled depending on a clock signal from a reference clock signal generator 32, the data are manipulated to perform deinterleaving, error correction is performed through the use of a parity code included in the data, and control data are detected. After the digital audio signal subjected to demodulation and correction by the demodulation/correction circuit 31 is processed by an audio signal processing circuit 33 inclusive of a D/A converter, a deglitcher circuit, etc., the signal is supplied to audio output terminals 34R and 34L for right and left channels.

A position detector 35 is provided near the movement path (which extends in the radial direction of the disk) of the pickup 3. When the detector 35 senses that the beam spot emitted from the pickup is at a position corresponding to the vicinity of the boundary between the CD region and video region of the complex disk 1, the detector generates a detection signal. It is judged from the presence of the generation of the detection signal that the pickup 3 has reached the video region. The position detector 35 may be a conventional photosensor or the like. The detection signal generated by the position detector 35 is supplied to the system controller 21.

The system controller 21 is implemented with a microcomputer having a CPU (central processing unit), a ROM (read-only memory), a RAM, etc. The system controller 21 is supplied with the horizontal synchronizing signal, the vertical synchronizing signal, the control data from the separation circuit 12, the control data from the demodulation/correction circuit 31, disk scheduling information sent from a control panel 6 and indicating whether the disk to be reproduced is a complex disk or compact disk, mode scheduling information indicating whether only the CD region, only the video region, or both the CD region and the video region are to be reproduced during reproduction of the complex disk 1, etc. In the system controller 21, the CPU processes the input signal in accordance with a program stored in the ROM to control the selection switches 15 and 25, the memory control circuit 19, a drive circuit (not shown) for driving the spindle motor 2, a drive circuit 37 for driving the slider motor 5, a display section 38, etc.

The procedure used by the CPU of the system controller 21 to reproduce the complex disk 1 will now be described with reference to the flowchart shown in FIG. 5.

When a start command is applied from a control panel 36 after loading the complex disk 1, the slider motor 5 is driven through the drive circuit 37 so that the pickup 3 is moved to the inner edge of the recorded portion of the disk in a step S1. When it is sensed by a detection switch that the pickup 3 has moved to the inner edge of the recorded portion of the disk 1, the pickup is focused and reference code information recorded in the audio lead-in area at the inner edge of the recording portion is read in a step S2. Subsequently, it is judged from the read out reference code information in a step S3 whether the loaded disk is a complex disk or not.

When it is judged in the step S3 that the disk is not a complex disk, the CPU proceeds to a step S4 to start reproduction in the CD playback mode and then to continue reproduction without change unless a command for the programmed selection of another tune or the like is received. Since reproduction in the CD playback mode is well known, such operations will not be described further in detail.

When it is determined in the step S3 that the disk is a complex disk, the spindle motor 2 is immediately accelerated to a prescribed maximum rotational speed for the video region of the disk in a step S5. At the same time, the slider motor 5 is rapidly rotated so that the pickup 3 is quickly moved toward the peripheral edge of the disk in a step S6.

When the detection signal from the position detector 35 is issued in a step S7 indicating that the pickup 3 has reached the video region of the disk, reproduction of the video region is started in a step S8. During reproduction of the video region, control is performed so that an amount of prescribed video information obtained from the disk and corresponding to at least one field or frame is written into the video memory 18. The video information may be the first-recorded information in the video region, or may be specified beforehand by address information entered through the control panel 36, for example.

When it is determined in a step S9 that reproduction of the video region has been completed, the spindle motor 2 is decelerated to a prescribed rotational speed for the CD region of the disk in a step S10. At the same time, the slider motor 5 is rapidly rotated so that the pickup 3 is quickly moved to the inner edge of the recorded portion of the disk in a step S11.

When the detection output from the detection switch is issued in a step S12, reproduction of the CD region of the disk is started in a step S13. At the same time, the selection switch 15 of the video information demodulator 8 is shifted to the (b) position so that the video information written in the video memory 18 during reproduction of the video region of the disk is chosen as the video output to reproduce a still picture during the reproduction of the CD region of the disk.

When termination of the reproduction of the CD region of the complex disk is detected through the reading of audio lead-out information in a step S14, if no special operation command has been inputted, the slider motor 5 is driven to move the pickup 3 to its home position in a step S15. The complex disk is then ejected by a loading mechanism (not shown) in a step S16, thus completing the series of reproducing operations.

In the above-described embodiment, when the loaded disk is a complex disk, reproduction of the video region is immediately performed, followed by that of the CD region. However, the present invention is not limited to such an arrangement and may be otherwise embodied in such a manner that reproduction of the disk is started with the CD region. In that case, only a small part of the video region of the disk need be reproduced beforehand, video information is obtained and stored in a video memory 18 during the reproduction of the small part of the video region, the CD region of the disk is thereafter reproduced, and a still picture is reproduced simultaneously with the reproduction of the CD region on the basis of the video information stored in the video memory.

Reproduction of the still picture is not limited to the period of reproduction of the CD region. For example, the still picture can be also reproduced on the basis of the stored video information in the video memory 18 during periods such as during jumping in the video region of the disk during which times the reproduced image is otherwise likely to be unstable.

In the above-described embodiment, an amount of video information obtained from the disk during reproduction of the video region corresponding to one field or frame is written into the video memory 18, and a still picture is thereafter reproduced from the video information during reproduction of the CD region. The present invention though may otherwise be practiced by eliminating the signal processing section for the video memory 18 and displaying only a prescribed color pattern or the like during reproduction of the CD region.

As described above, in a disk reproducing apparatus constituted in accordance with the present invention, a video memory capable of storing the amount of video information for at least one field is provided, an amount of video information for at least one field is read from the complex disk and written into the video memory during reproduction of the video region of the disk, and the video information is read from the video memory and supplied as a video output during reproduction of at least the CD region of the disk. With this arrangement, an image related to the reproduction of the CD region can be displayed during its reproduction.

When the disk to be reproduced is a complex disk, the video region of the disk is reproduced with priority over any other region, making it always possible to reproduce the main program of the complex disk. For that reason, the complex disk can be reproduced in conformity with the intention of the program provider.

While the present invention has been described with reference to a specific embodiment, it will be appreciated by one skilled in the art that a variety of changes may be made without departing from the scope of the invention. For example, a switch 39 may be connected to the system controller 21, which selectively provides indications of the audio region (CD region) and the video region of the complex disk. Under the condition that the video region reproduction is being selected by the switch 39, when it is judged that the disk is the compact disk, the procedure of the system controller 21 as shown in the flowchart of FIG. 5 is changed so that after implementing the steps S1 through S7, at least one frame of the video information is stored in a memory, and then it proceeds to step S10.

What is claimed is:

1. An apparatus for reproducing a disk having provided on at least one side thereof a first region wherein only a prescribed digital signal is recorded and a second region wherein a video signal subjected to frequency modulation and a prescribed digital signal are recorded together in a superposed state, comprising: a video memory capable of storing an amount of video information for at least one field; means for selecting said video information from said video memory and supplying said video information as a video output during reproduction of at least said first region; and control means for reading said amount of video information for at least one field from said disk, writing said information into said video memory during reproduction of said second region, and reading said information from said video memory during reproduction of at least said first region to provide a video output.

2. The apparatus of claim 1, wherein said prescribed digital signal is an audio signal.

3. A method for operating an information reproducing system capable of reproducing both a first type disk, on at least one side of which a first region wherein only a prescribed digital signal is recorded and a second region wherein a video signal subjected to frequency modulation and a prescribed digital signal are recorded together in a superposed state, and a second type disk whereon a prescribed digital signal is recorded in the entire recording region of said second disk, comprising the steps of: reading information recorded in a lead-in area at the beginning of the reproduction of each of said disks; judging from said information whether said disk to be reproduced is a first type disk; and immediately moving an information detection point of a pickup toward said second region to reproduce said second region with priority over any other region of said disk when said disk is said first type disk.

4. The method for operating an information reproducing system according to claim 3, further comprising the step of starting reproduction of said first region after said second region has been reproduced.

5. A method for operating an information reproducing system capable of reproducing both a first type of disk, on at least one side of which a first region wherein only a digital audio signal is recorded and a second region wherein a video signal subjected to frequency modulation and a digital audio signal are recorded together in a superposed state, and a second type disk whereon a digital audio signal is recorded over the entire recording region of the disk, comprising the steps of: loading a disk into a playing position in said system; rotating said disk at a speed appropriate for reproducing a disk of said first type; moving a pickup to an inner edge of the disk and reading a reference code from the disk; determining from said reference code whether said disk is of the first or second type; reproducing said disk directly if it is of the second type; if said disk is of the first type, accelerating said disk to rotate at a speed appropriate for reproducing said video signal; moving said pickup to said second region and reproducing video and audio information recorded in said second region; during reproduction of said video and audio information in said second region, storing a predetermined portion of the video information corresponding to at least one frame in a memory; when reproduction of said second region has been completed, starting reproduction of said first region; and, during reproduction of said first region, displaying the at least one frame of video information stored in said memory.

* * * * *